UNITED STATES PATENT OFFICE.

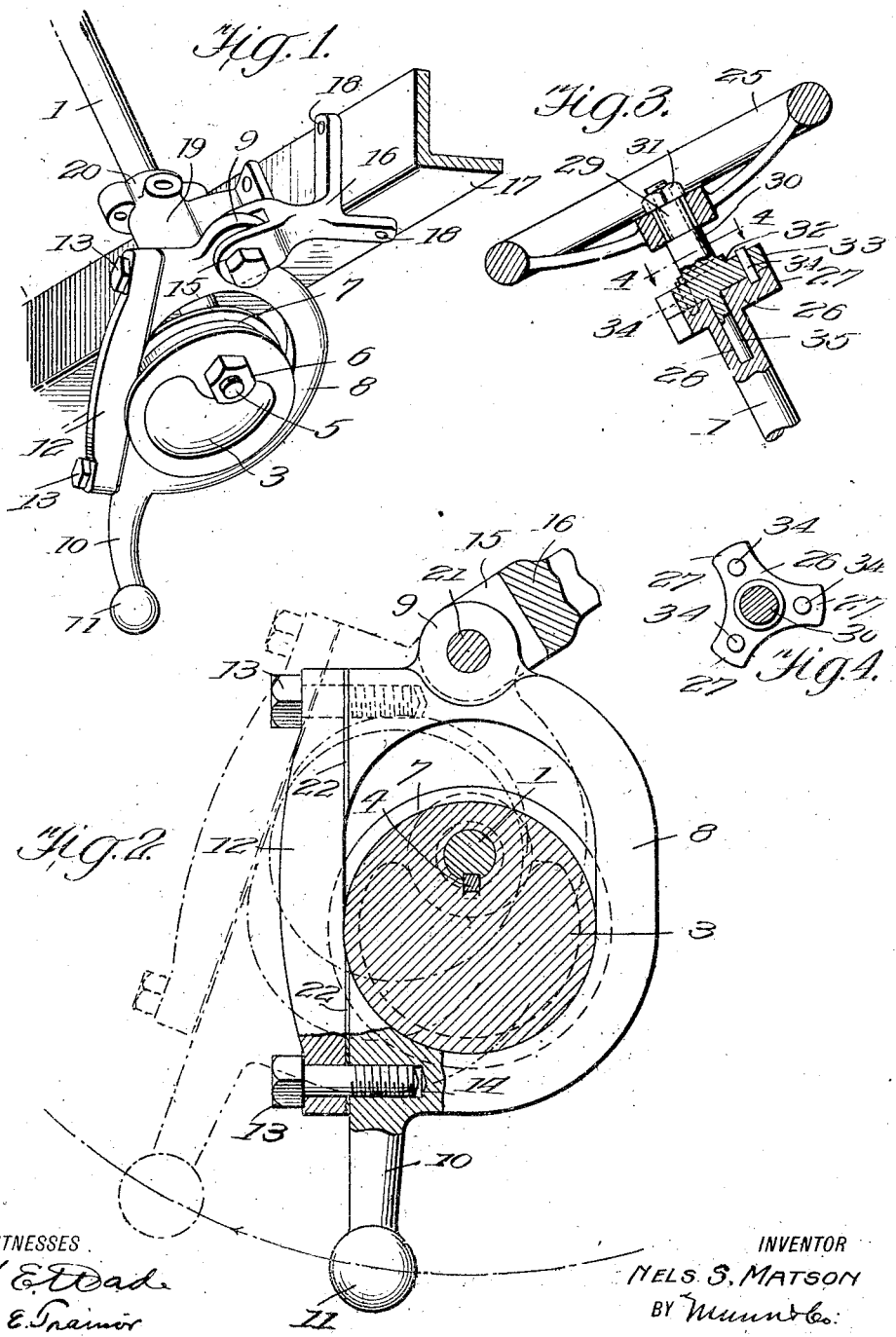

NELS S. MATSON, OF FARGO, NORTH DAKOTA.

AUTOMOBILE STEERING DEVICE.

1,152,194.   Specification of Letters Patent.   Patented Aug. 31, 1915.

Application filed January 12, 1915. Serial No. 1,801.

*To all whom it may concern:*

Be it known that I, NELS S. MATSON, a citizen of the United States, and a resident of Fargo, in the county of Cass and State of North Dakota, have made certain new and useful Improvements in Automobile Steering Devices, of which the following is a specification.

My invention is an improvement in automobile steering devices, and has for its object to provide a device of the character specified, especially adapted for use with the Ford automobile, and arranged to reduce the leverage on the steering post, and to permit a part of the steering mechanism now in use to be omitted, and wherein the lost motion between the steering wheel and the spindles is eliminated.

In the drawings: Figure 1 is a perspective view of the device, Fig. 2 is a horizontal section, Fig. 3 is a vertical section through the upper end of the post and the steering wheel, and Fig. 4 is a section on the line 4—4 of Fig. 3 looking in the direction of the arrows adjacent to the line.

The present embodiment of the invention is shown in connection with the steering post 1 of an automobile, and an eccentric wheel or disk 3 is secured to the lower end of the post, by means of a key 4. The extremity of the post is reduced below the eccentric, as shown at 5, and a nut 6 is threaded on to the reduced portion to prevent displacement of the eccentric disk or wheel. This eccentric disk or wheel is annularly grooved, as shown at 7, and the disk engages within the elliptical opening of a frame 8 of approximately C-shape. At one end the frame is provided with a perforated bearing lug 9, and at the other end the frame is provided with an extension 10 having a ball 11 at its free end, for connection with the usual steering link or bar connected with the spindles of the front wheel.

The C-shaped frame 8 is in effect a split loop, having the split at one side and extending parallel with the long axis of the frame, and this split is normally closed by a bar 12, the said bar fitting against the side of the frame at the split, and being secured to the frame by means of set screws 13, which are passed through openings in the ends of the bar, and into engagement with internally threaded openings 14 in the frame.

The bar 12 completes the loop, and the frame and bar are of such thickness that they will fit within the groove 7 of the eccentric. The lug 9 of the frame is received between a pair of lugs 15 on an angle bracket 16, and is pivoted to the lugs by a bolt 21. The arms of the bracket fit the frame 17 of the automobile and are secured thereto, as indicated at 18, in any suitable manner.

The frame 8 is mounted to swing with respect to the automobile frame, being pivoted to the frame or the bracket 16, and it will be evident that when the post is oscillated the frame will be swung on its pivotal connection, because of the movement of the eccentric wheel or disk 3. The arm 10 will swing to a greater extent than any other portion of the frame, and it will be evident that but a slight movement of the steering post, that is of the eccentric 3 is necessary to cause the arm 10 to swing over a considerable distance. Plates 22 are arranged between the ends of the bars 12 and the body of the frame 8, to properly space the bar, and each plate has an opening at its outer end through which the adjacent set screw 13 extends.

In operation, when the steering post is oscillated in the usual manner, the eccentric will be rotated, and will move the frame, swinging the frame on its pivotal connection with the frame of the automobile. The frame 10 will be swung, as indicated in dotted lines in Fig. 2, and since this arm is connected to the steering bar, the wheels will be swung to guide the vehicle, with but a slight effort on the part of the driver, and with a great reduction of strain on the several parts.

In order to cut out the lost motion between the steering wheel 25 and the post 1, the mechanism shown in Figs. 3 and 4 is provided for connecting the wheel to the post. In the Ford automobile the upper end of the steering post 1 is provided with the integral head 26 having lugs 27 extending radially from the post at angles of 120° with respect to each other. The post is also provided with the axial socket 28. The hub of the steering wheel 25 engages the reduced upper end 29 of an extension post 30, and the hub is held in place by a nut 31 threaded on to the extension post above the hub. At its lower end the extension post is provided with an integral head 32 having arms 33 extending at angles of 120° with respect to each other and radially with respect to the extension post.

Each arm 33 is provided with an opening near its outer end, for receiving an upwardly extending pin 34 on the adjacent arm 27 of the head 26, and the head is also provided with an axial pin 35 for engaging the opening 28 of the post. Thus the connection between the steering wheel and the post is direct instead of indirect, and the post moves with the wheel. It is obvious that with this connection there can be no lost motion between the post and the wheel.

I claim:

1. The combination with the steering post of an automobile, and the bearing for the lower end thereof, of an eccentric wheel detachably connected to the lower end of the post to move with the post, said wheel having an annular peripheral groove, an elliptical frame inclosing the wheel and engaging in the groove, said frame being sectional to permit the insertion and removal of the wheel, said frame having a bearing lug at one end of its long axis and a steering arm at the other end, a bracket for connection with the frame of the automobile and having a pair of spaced bearing lugs between which the lug of the elliptical frame is received, and a pivotal connection between the lugs, the arm being adapted for connection with the steering bar of the automobile at its outer end.

2. The combination with the steering post of an automobile, of an eccentric wheel secured to the lower end thereof and having a peripheral groove, an elliptical frame inclosing the wheel and engaging in the groove, said frame being sectional to permit the insertion and removal of the wheel, a pivotal connection between the frame at one end of its long axis and the frame of the automobile, said frame having a steering arm at the other end of the axis for connection with the steering mechanism of the automobile.

3. The combination with the steering post of an automobile, of an eccentric wheel secured to the lower end thereof and having a peripheral groove, an elliptical frame inclosing the wheel and engaging in the groove, a pivotal connection between the frame at one end of its long axis and the frame of the automobile, said frame having a steering arm at the other end of the axis for connection with the steering mechanism of the automobile.

4. The combination with the steering post of an automobile, of an eccentric wheel connected thereto, a frame having an elliptical opening in which the wheel moves, a pivotal connection between one end of the frame at its long axis and the frame of the automobile, and an arm at the opposite end of the frame for connection with the steering bar of the automobile.

5. The combination with the steering post of a vehicle, of an eccentric wheel secured thereto, a frame having an approximately elliptical opening in which the wheel is movable, said frame being pivoted to a fixed support at one end of its long axis and adapted for connection at the other end with the steering mechanism of the vehicle.

NELS S. MATSON.

Witnesses:
A. M. CORNWALL,
JAMES McGUIGAN.